United States Patent
Ohara et al.

(10) Patent No.: US 12,054,568 B2
(45) Date of Patent: Aug. 6, 2024

(54) OPTICAL MATERIAL COMPOSITION AND OPTICAL MATERIAL

(71) Applicant: TOKUYAMA CORPORATION, Shunan (JP)

(72) Inventors: Ayako Ohara, Tsukuba (JP); Taichi Hanasaki, Tsukuba (JP); Junji Takenaka, Tsukuba (JP); Junji Momoda, Tsukuba (JP)

(73) Assignee: TOKUYAMA CORPORATION, Shunan (JP)

( * ) Notice: Subject to any disclaimer, the term of this patent is extended or adjusted under 35 U.S.C. 154(b) by 568 days.

(21) Appl. No.: 17/413,841

(22) PCT Filed: Dec. 17, 2019

(86) PCT No.: PCT/JP2019/049279
§ 371 (c)(1),
(2) Date: Jun. 14, 2021

(87) PCT Pub. No.: WO2020/129933
PCT Pub. Date: Jun. 25, 2020

(65) Prior Publication Data
US 2022/0056170 A1    Feb. 24, 2022

(30) Foreign Application Priority Data

Dec. 17, 2018   (JP) ................................ 2018-235551
Dec. 18, 2018   (JP) ................................ 2018-236343
Dec. 18, 2018   (JP) ................................ 2018-236344

(51) Int. Cl.
| | |
|---|---|
| C08F 2/46 | (2006.01) |
| C08F 2/50 | (2006.01) |
| C08F 20/14 | (2006.01) |
| C08F 222/10 | (2006.01) |
| C08F 290/14 | (2006.01) |
| C08G 61/04 | (2006.01) |
| C08K 5/3475 | (2006.01) |
| C08L 75/06 | (2006.01) |
| G02B 1/111 | (2015.01) |
| G02B 1/04 | (2006.01) |

(52) U.S. Cl.
CPC .......... *C08F 222/1063* (2020.02); *C08F 2/50* (2013.01); *C08F 20/14* (2013.01); *C08F 290/142* (2013.01); *C08K 5/3475* (2013.01); *C08L 75/06* (2013.01); *G02B 1/111* (2013.01); *C08F 2800/20* (2013.01); *G02B 1/041* (2013.01)

(58) Field of Classification Search
CPC ...... C08L 75/00; C08L 2666/70; C08L 33/10; C09D 4/00; G02B 1/111; G02B 1/041; G02C 7/08; C08F 222/1063; C08F 222/1025; C08F 222/103; C08F 222/102; C08F 2/48; C08F 2/50; C08F 2/44; C08F 290/142; C08F 20/14; C08F 2800/20; C08F 220/325

USPC .......... 522/9, 8, 7, 6, 71, 1, 189, 184; 520/1
See application file for complete search history.

(56) References Cited

U.S. PATENT DOCUMENTS

| | | | |
|---|---|---|---|
| 3,493,539 A | * | 2/1970 | Fertig .................. C07D 249/20 524/548 |
| 6,365,223 B1 | * | 4/2002 | Yoshimura ............. G02B 1/041 427/430.1 |
| 10,371,867 B2 | | 8/2019 | Tomoda et al. |
| 10,745,539 B2 | | 8/2020 | Kousaka et al. |
| 10,752,726 B2 | | 8/2020 | Kageyama et al. |
| 2002/0028918 A1 | | 3/2002 | Kasada et al. |
| 2005/0113478 A1 | | 5/2005 | Suzuki |
| 2010/0238540 A1 | | 9/2010 | Miyakawa |
| 2015/0370094 A1 | | 12/2015 | Hashimoto et al. |
| 2016/0223839 A1 | | 8/2016 | Kakinuma et al. |
| 2017/0153484 A1 | | 6/2017 | Tamura et al. |
| 2018/0016415 A1 | | 1/2018 | Kakinuma et al. |
| 2018/0273673 A1 | | 9/2018 | Kageyama et al. |
| 2018/0340044 A1 | | 11/2018 | Kakinuma et al. |
| 2020/0270421 A1 | | 8/2020 | Namiki et al. |

FOREIGN PATENT DOCUMENTS

| | | |
|---|---|---|
| CN | 108026277 A | 5/2018 |
| CN | 108473643 A | 8/2018 |
| EP | 3 640 686 A1 | 4/2020 |
| JP | H06-128503 A | 5/1994 |
| JP | 2001-235601 A | 8/2001 |

(Continued)

OTHER PUBLICATIONS

Ishihara, JP 2018197833 Machine Translation, Dec. 13, 2018 (Year: 2018).*

(Continued)

*Primary Examiner* — Jessica Whiteley
(74) *Attorney, Agent, or Firm* — Birch, Stewart, Kolasch & Birch, LLP

(57) ABSTRACT

The present invention is an optical material composition containing (A) 100 parts by mass of a polymerizable monomer, and (B) 0.001 to 0.3 parts by mass of a UV absorbent having a maximum absorption wavelength of 360 nm or more and less than 380 nm and having a specific structure, and an optical material formed of the composition. According to the present invention, there can be provided an optical material composition containing a UV absorbent and having good long-term storage stability, and an optical material formed of the composition, in particular, an optical material composition capable of forming a plastic lens having a high blue light cut rate.

6 Claims, No Drawings

(56) References Cited

FOREIGN PATENT DOCUMENTS

| | | | |
|---|---|---|---|
| JP | 3223460 B2 | | 10/2001 |
| JP | 2008-56854 A | | 3/2008 |
| JP | 2008-134618 A | | 6/2008 |
| JP | 2010-84006 A | | 4/2010 |
| JP | 2011-145341 A | | 7/2011 |
| JP | 4813900 B2 | | 11/2011 |
| JP | 2012-41333 A | | 3/2012 |
| JP | 2012-93689 A | | 5/2012 |
| JP | 2012-173704 A | | 9/2012 |
| JP | 2012-219169 A | | 11/2012 |
| JP | 5620033 B1 | | 11/2014 |
| JP | 2016-125049 A | | 7/2016 |
| JP | 2016-166138 A1 | | 9/2016 |
| JP | 2017-19903 A | | 1/2017 |
| JP | 2017-31230 A | | 2/2017 |
| JP | 2018-16778 A | | 2/2018 |
| JP | 6294386 B2 | | 3/2018 |
| JP | 2018-087262 A | | 6/2018 |
| JP | 2018-97173 A | | 6/2018 |
| JP | 2018197833 | * | 12/2018 |
| JP | 2018197833 A | * | 12/2018 |
| JP | 7151726 B2 | | 10/2022 |
| TW | 201437670 A | | 10/2014 |
| WO | WO 2009/038134 A1 | | 3/2009 |
| WO | WO 2014/155787 A1 | | 10/2014 |
| WO | WO 2015/037628 A1 | | 3/2015 |
| WO | WO 2017/182639 A1 | | 10/2017 |

OTHER PUBLICATIONS

Chinese Office Action and Search Report for Chinese Application No. 201980082234.6, dated Aug. 23, 2022.
Extended European Search Report for European Application No. 19898115.1, dated Sep. 16, 2022.
Extended European Search Report for European Application No. 19899636.5, dated Sep. 16, 2022.
Japanese Office Action for corresponding Japanese Application No. 2020-561430, dated Jul. 4, 2023.
U.S. Office Action for U.S. Appl. No. 17/413,754, dated Sep. 21, 2023.
Chinese Notice of Allowance and Search Report for Chinese Application No. 201980082160.6, dated Mar. 16, 2022.
International Search Report for PCT/JP2019/049276 mailed on Mar. 24, 2020.
International Search Report for PCT/JP2019/049277 mailed on Mar. 10, 2020.
International Search Report for PCT/JP2019/049279 mailed on Mar. 10, 2020.
Written Opinion of the International Searching Authority for PCT/JP2019/049276 (PCT/ISA/237) mailed on Mar. 24, 2020.
Written Opinion of the International Searching Authority for PCT/JP2019/049277 (PCT/ISA/237) mailed on Mar. 10, 2020.
Written Opinion of the International Searching Authority for PCT/JP2019/049279 (PCT/ISA/237) mailed on Mar. 10, 2020.
Chinese Office Action for Chinese Application No. 201980082137.7, dated Oct. 10, 2022.
Japanese Notice of Allowance for corresponding Japanese Application No. 2020-561431, dated Jan. 17, 2023.
Chinese Office Action and Search Report for Chinese Application No. 201980082234.6, dated Mar. 16, 2022.
U.S. Notice of Allowance for U.S. Appl. No. 17/413,754, dated Jan. 24, 2024.
U.S. Office Action for U.S. Appl. No. 17/413,667, dated Jan. 22, 2024.
U.S. Notice of Allowance for U.S. Appl. No. 17/413,667, dated May 1, 2024.

* cited by examiner

OPTICAL MATERIAL COMPOSITION AND OPTICAL MATERIAL

TECHNICAL FIELD

The present invention relates to a UV absorbent-containing optical material composition having good long-term storage stability and an optical material formed of it, in particular to an optical material composition capable of forming plastic lenses having a high blue light cut rate.

BACKGROUND ART

Heretofore, negative influences on eyes by exposure to UV rays have been regarded as a problem. Further, recently, it has become said that, regarding ocular health, light in a blue region (380 to 500 nm) (hereinafter this may also be referred to as blue light) may cause damage to the retina as the energy thereof is strong. Damage by blue light is called "blue light hazard", and for preventing this, it is said to be especially desirable to cut blue light having a relatively short wavelength of 380 to 420 nm or so.

For solving the problem, for example, PTL 1 proposes a lens having a multilayer film formed on a convex surface of a plastic member, in which the multilayer film has an average reflectance in a wavelength range of 400 to 500 nm of 2 to 10%. However, the blue light cut rate of the lens measured was around 30%.

PTLs 2 and 3 describe a polymerizable composition for lenses, which contains a benzotriazole-based UV absorbent and has an increased light cut rate, but these focus on absorption at around 405 nm or less and do not discuss matters at all relating to blue light cut rate.

PTLs 4 and 5 propose a polymerizable composition for lenses, which contains a UV absorbent 2-(2-hydroxy-3-t-butyl-5-methylphenyl)-chlorobenzotriazole and has an increased blue light cut rate, but the UV absorbent has a low solubility in monomer and therefore the long-term storage stability thereof is poor.

CITATION LIST

Patent Literature

PTL 1: JP 2012-093689 A
PTL 2: JP 2008-056854 A
PTL 3: JP 2010-84006 A
PTL 4: JP 5620033
PTL 5: JP 6294386

SUMMARY OF INVENTION

Technical Problem

Accordingly, an object of the present invention is to provide an optical material composition having good long-term storage stability and an optical material formed of it, especially an optical material composition capable of forming plastic lenses having a high blue light cut rate.

Solution to Problem

The present inventors have assiduously studied for the purpose of attaining the above-mentioned object and, as a result, have found that, using a UV absorbent that has a maximum absorption wavelength of 360 nm or more and less than 380 nm and contains a benzotriazole compound having a specific structure, the above-mentioned object can be attained, and have completed the present invention.

Specifically, the present invention is:

[1] An optical material composition containing (A) 100 parts by mass of a polymerizable monomer, and (B) 0.001 to 0.3 parts by mass of a UV absorbent having a maximum absorption wavelength of 360 nm or more and less than 380 nm and represented by the following formula (1):

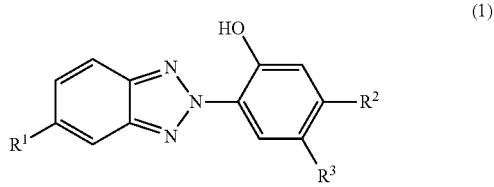

wherein $R^1$ represents a hydrogen atom, an alkyl group having 1 to 8 carbon atoms, an alkoxy group having 1 to 8 carbon atoms, a hydroxy group, a linear or branched mono-substituted amino group having 1 to 4 carbon atoms, a linear or branched di-substituted amino group having 1 to 4 carbon atoms, a nitro group, a carboxy group, an alkyloxycarbonyl group in which the alkyl group has 1 to 8 carbon atoms, a hydroxyalkyl group having 1 to 8 carbon atoms, an alkylcarbonyloxyalkyl group in which the alkyl groups each have 1 to 8 carbon atoms, a carboxyalkyl group in which the alkyl group has 1 to 3 carbon atoms, an alkyloxycarbonylalkyl group in which the total of the carbon atoms of the alkyl groups is 2 to 10, an aryl group, an acyl group, a sulfo group or a cyano group; $R^2$ represents a hydroxy group, an alkoxy group having 1 to 8 carbon atoms, an alkylthio group having 1 to 8 carbon atoms, a linear or branched non-substituted amino group having 1 to 4 carbon atoms, or a linear or branched di-substituted amino group having 1 to 4 carbon atoms; $R^3$ represents a hydrogen atom, a hydroxy group, an alkyl group or alkoxy group having 1 to 8 carbon atoms, a linear or branched mono-substituted amino group having 1 to 4 carbon atoms, or a linear or branched di-substituted amino group having 1 to 4 carbon atoms; and $R^2$ and $R^3$ may crosslink to form a cyclic structure.

The present invention can include the following embodiments.

[2] The optical material composition according to the above [1], wherein the polymerizable monomer (A) contains at least one polyisocyanate compound selected from bis(isocyanatemethyl)bicyclo[2.2.1]heptane, xylylene diisocyanate, 4,4'-methylenebisphenyl bisisocyanate, 2,4'-methylenebisphenyl bisisocyanate and methyl-1,3-phenylene diisocyanate, and at least one polythiol compound selected from pentaerythritol tetrakis(3-mercaptopropionate) and 1,2-bis(2-mercaptoethylthio)-3-mercaptopropane.

[3] The optical material composition according to the above [1], wherein the polymerizable monomer (A) contains bis(2,3-epithiopropyl)disulfide, and a mixture consisting primarily of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane.

[4] An optical material formed of a cured product produced by polymerizing and curing the optical material composition of any of the above [1] to [3], which has a light transmittance at a wavelength of 400 nm of 5% or less, a light transmittance at a wavelength of 420 nm of 70% or less, and a light cut rate in a wavelength range of 380 to 500 nm of 35% or more.

[5] A plastic lens formed of the optical material of the above [4].

In the present invention, the maximum absorption wavelength of each compound is measured in a solvent not having any influence on the measurement. An example so the solvent is chloroform.

Advantageous Effects of Invention

By polymerizing and curing the optical material composition of the present invention, an optical material having a high blue light cut rate, especially a plastic lens formed of the optical material can be obtained. In addition, since the composition has good storage stability, the utility value thereof is high.

DESCRIPTION OF EMBODIMENTS

The optical material composition of the present invention is an optical material composition containing:
(A) 100 parts by mass of a polymerizable monomer, and
(B) 0.001 to 0.3 parts by mass of a UV absorbent having a maximum absorption wavelength of 360 nm or more and less than 380 nm and having a specific structure.

The components are described below.

<Component (A): Polymerizable Monomer>

In the present invention, known polymerizable monomers can be used.

Polymerizable monomers favorably used in the optical material composition are known addition-polymerizable monomers (hereinafter this may be simply referred to as "component (A1)"), cationic-polymerizable monomers (hereinafter this may be simply referred to as "component (A2)") and radical-polymerizable monomers (hereinafter this may be simply referred to as "component (A3)").

<(A1) Addition-Polymerizable Monomers>

With no specific limitation, any known addition-polymerizable monomers are usable in the present invention, and examples thereof are monomers that may be raw materials to give resins such as a polyurethane resin, a polythiourethane resin, a polyurea resin, a polyurethane-polyurea resin, and a polythiourethane-polyurea resin. Specifically, usable are a combination of a polyisocyanate compound and a polyol compound, a combination of a polyisocyanate compound and a polythiol compound, a combination of a polyisocyanate compound and a polyamine compound, a combination of a polyisocyanate compound, a polyol compound and a polyamine compound, and a combination of a polyisocyanate compound, a polythiol compound and a polyamine compound. These monomer combinations can be used either singly or as mixed.

Hereinunder, addition-polymerizable monomers are described in detail.

<(A1-1) Polyisocyanate Compound>

The polyisocyanate compound (hereinafter this may be simply referred to as a component (A1-1)) is not specifically limited, and examples thereof include an aliphatic isocyanate compound such as bis(isocyanatomethyl)cyclohexane, bis(isocyanatomethyl)bicyclo[2.2.1]heptane, hydrogenated 2,6-tolylene diisocyanate, hydrogenated metaphenylene diisocyanate, hydrogenated paraphenylene diisocyanate, hydrogenated 2,4-tolylene diisocyanate, hydrogenated diphenylmethane diisocyanate, hydrogenated metaxylylene diisocyanate, hydrogenated paraxylylene diisocyanate, and isophorone diisocyanate; an aromatic isocyanate compound such as phenylene diisocyanate, tolylene diisocyanate, diphenylmethane diisocyanate, xylylene diisocyanate, tetramethylxylylene diisocyanate, 2,6-naphthalene diisocyanate, and 1,5-naphthalene diisocyanate; an alicyclic or aromatic ring-free isocyanate compound such as hexamethylene diisocyanate, octamethylene diisocyanate, 2,2,4-trimethylhexamethylene diisocyanate, tetramethylene diisocyanate, biuret reaction product of hexamethylene diisocyanate, trimer of hexamethylene diisocyanate, lysine diisocyanate, lysine triisocyanate, 1,6,11-undecane triisocyanate, and triphenylmethane triisocyanate; and a sulfur-containing isocyanate compound such as diphenyl disulfide-4,4'-diisocyanate, 2,2'-dimethyldiphenyldisulfide-5,5'-diisocyanate, 3,3'-dimethyldiphenyl disulfide-5,5'-diisocyanate, 3,3'-dimethyldiphenyldisulfide-6,6'-diisocyanate, 4,4'-dimethyldiphenyl disulfide-5,5'-diisocyanate, 3,3'-dimethoxydiphenyl disulfide-4,4'-diisocyanate, 4,4'-dimethoxydiphenyldisulfide-3,3'-diisocyanate, diphenylsulfone-4,4'-diisocyanate, diphenylsulfone-3,3'-diisocyanate, benzylidene sulfone-4,4'-diisocyanate, diphenylmethane sulfone-4,4'-diisocyanate, 4-methyldiphenylmethanesulfone-2,4'-diisocyanate, 4,4'-dimethoxydiphenyl sulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenyl sulfone-3,3'-diisocyanate, 4,4'-dimethoxybenzene-ethylene disulfone-3,3'-diisocyanate, 4,4'-dichlorodiphenylsulfone-3,3'-diisocyanate, 4-methyl-3-isocyanatobenzenesulfonyl-4'-isocyanatophenolester, 4-methoxy-3-isocyanatobenzenesulfonyl-4'-isocyanatophenolester, 4-methyl-3-isocyanatobenzenesulfonylanilido-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate, 4-methyl-3-isocyanatobenzenesulfonylanilido-4-methyl-3'-isocyanate, thiophene-2,5-diisocyanate, thiophene-2,5-diisocyanatomethyl, 1,4-dithiane-2,5-diisocyanate, 1,4-dithiane-2,5-diisocyanatomethyl, 1,4-dithiane-2,3-diisocyanatomethyl, 1,4-dithiane-2-isocyanatomethyl-5-isocyanatopropyl, 1,3-dithiolane-4,5-diisocyanate, 1,3-dithiolane-4,5-diisocyanatomethyl, 1,3-dithiolane-2-methyl-4,5-diisocyanatomethyl, 1,3-dithiolane-2,2-diisocyanatoethyl, tetrahydrothiophene-2,5-diisocyanate, tetrahydrothiophene-2,5-diisocyanatomethyl, tetrahydrothiophene-2,5-diisocyanatoethyl, and tetrahydrothiophene-3,4-diisocyanatomethyl. Among these, alicyclic isocyanate compounds are preferred.

<(A1-2) Polythiol Compound>

The polythiol compound (hereinafter this may be simply referred to as a component (A1-2)) includes an aliphatic thiol such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl)thiomalate, (2-mercaptoethyl) 2,3-dimercatosuccinate, 2,3-dimercapto-1-propanol(2-mercaptoacetate), 2,3-dimercapto-1,2-propanol(3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), and 1,2-bis(2-mercaptoethylthio)-3-mercaptopropane; an aromatic thiol such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(meraptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane; a halogen-substituted, e.g., chlorine-substituted or bromine-substituted, aromatic thiol such as 2,5-dichlorobenzene-1,3-dithiol, 1,3-di(p-chlorophenyl)propane-2,2-dithiol, 3,4,5-tribromo-1,2-dimercaptobenzene, and 2,3,4,6-tetrachloro-1,5-bis(mercaptomethyl)benzene; an aromatic thiol having a sulfur atom in addition to a mercapto group, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and alkylated compounds thereof; an aliphatic thiol having a sulfur atom in addition to a mercapto group, such as bis(mercaptomethyl) sulfide, bis(mercaptoethyl) sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, and bis(mercaptopropyl)disulfide, and esters thereof with thioglycolic acid and mercaptopropionic acid, hydroxymethylsulfide bis(2-meraptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptoacetate), 1,4-dithiane-2,5-diol bis(3-meraptopropionate), (2-mercaptoethyl)thioglycolate, bis(2-mercaptoethyl)thiodipropionate, bis(2-mercaptoethyl) 4,4'-thiodibutyrate, bis(2-mercaptoethyl)dithiodiglycolate, bis(2-mercaptoethyl)dithiodipropionate, bis(2-mercaptoethyl) 4,4'-dithiodibutyrate, bis(2,3-dimercaptopropyl)thiodiglycolate, bis(2,3-dimercaptopropyl)thiodipropionate, bis(2,3-dimercaptopropyl)dithiodiglycolate, bis(2,3-dimercaptopropyl)dithiodipropionate, 4-mercaptomethyl-3,6-dithiaoctane-1,8-dithiol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and bis(1,3-dimercapto-2-propyl)sulfide; and a heterocyclic compound having a sulfur atom in addition to a mercapto group, such as 3,4-thiophene-dithiol, tetrahydrothiophene-2,5-dimercaptomethyl, 2,5-dimercapto-1,3,4-thiadiazole, 2,5-dimercapto-1,4-dithiane, and 2,5-dimercaptomethyl-1,4-dithiane.

<(A1-3) Polyol Compound>

Examples of the polyol compound (hereinafter this may be simply referred to as a component (A1-3)) include an aliphatic polyol such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl)isocyanurate, cyclobutanediol, cyclopentanediol, cyclohexanediol, cycloheptanediol, cyclooctanediol, bicyclo[4.3.0]-nonanediol, dicyclohexanediol, tricyclo[5.3.1.1]dodecanediol, spiro[3.4]octanediol, and butylcyclohexanediol; an aromatic polyol such as dihydroxynaphthalene, trihydroxynaphthalene, tetrahydroxynaphthalene, dihydroxybenzene, benzenetriol, trihydroxyphenanthrene, bisphenol A, bisphenol F, xylylene glycol, or tetrabromobisphenol A, and an addition reaction product thereof with an alkylene oxide such as ethylene oxide or propylene oxide; bis[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis[2-methyl-4-

(hydroxyethoxy)-6-butylphenyl]sulfide, and a compound prepared by adding 3 molecules on average, per one hydroxy group, of ethylene oxide and/or propylene oxide to any of these compounds; and a sulfur atom-containing polyol such as bis(2-hydroxyethyl)sulfide, 1,2-bis-(2-hydroxyethylmercapto)ethane, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone (trade name, Bisphenol S), tetrabromobisphenol S, tetramethylbisphenol S, 4,4'-thiobis(6-tert-butyl-3-methylphenol), and 1,3-bis(2-hydroxyethylthioethyl)-cyclohexane.

<(A1-4) Polyamine Compound>

Examples of the polyamine compound (hereinafter this may be simply referred to as "a component" (A1-4)) include hexamethylenediamine, and bis(4-aminocyclohexyl)methane.

<(A2) Cationic-Polymerizable Monomer>

Not specifically limited, any known cationic-polymerizable monomer is usable in the present invention, and is, for example, a monomer to be a raw material for obtaining an epoxy resin and a polysulfide resin. Specifically, examples thereof include a polyepoxy compound, a polyepithio compound and a polythietane compound that are monomers polymerizable in a mode of ring-opening polymerization, and a compound to be prepared by reaction of a polyepithio compound and a polythiol compound. Any polyepoxy compound, polyepithio compound or polythietane compound known as a monomer (hereinafter these may be simply referred to as a component (A2-1), a component (A2-2) and a component (A2-3), respectively) is usable with no limitation. For the polythiol compound, those exemplified hereinabove as the component (A1-2) are usable.

Hereinafter, the cationic-polymerizable monomer is described in detail.

<(A2-1) Polyepoxy Compound>

The polyepoxy compound is roughly grouped into an aliphatic epoxy compound, an alicyclic epoxy compound and an aromatic epoxy compound, and specific examples thereof are shown below.

The aliphatic epoxy compound includes ethylene oxide, 2-ethyloxirane, butyl glycidyl ether, phenyl glycidyl ether, 2,2'-methylenebisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonamethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, tris(2-hydroxyethyl)isocyanurate diglycidyl ether, and tris(2-hydroxyethyl)isocyanurate triglycidyl ether.

The alicyclic epoxy compound includes isophoronediol diglycidyl ether, and bis-2,2-hydroxycyclohexylpropane diglycidyl ether.

The aromatic epoxy compound includes resorcin diglycidyl ether, bisphenol A diglycidyl ether bisphenol F diglycidyl ether, bisphenol S diglycidyl ether, diglycidyl orthophthalate, phenol-novolak polyglycidyl ether, and cresol-novolak polyglycidyl ether.

<(A2-2) Polyepithio Compound>

Specific examples of the polyepithio compound include an epithioethylthio compound such as bis(1,2-epithioethyl) sulfide, bis(1,2-epithioethyl)disulfide, bis(epithioethylthio) methane, bis(epithioethylthio)benzene, bis[4-(epithioethylthio)phenyl]sulfide, and bis[4-(epithioethylthio)phenyl] methane; a linear aliphatic 2,3-epithiopropylthio compound such as bis(2,3-epithiopropyl)sulfide, bis(2,3-epithiopropyl) disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 1,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio)ethyl]thiomethyl]-2-(2,3-epithiopropylthio)ethane, 1,1,2,2-tetrakisn-(2,3-epithiopropythio)ethylithiomethyliethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane; a cycloaliphatic 2,3-epithiopropylthio compound such as 1,3-bis(2,3-epithiopropylthio)cyclohexane, 1,4-bis(2,3-epithiopropylthio)cyclohexane, 1,3-bis(2,3-epthiopropylthiomethyl)cyclohexane, 1,4-bis(2,3-epithiopropylthiomethyl) cyclohexane, 2,5-bis(2,3-epithiopropylthiomethyl)-1,4-dithiane, 2,5-bis[1,2-(2,3-epithiopropylthio)ethyl] thiomethyli-1,4-dithiane, and 2,5-bis(2,3-epithiopropylthiomethyl)-2,5-dimethyl-1,4-dithiane; an aromatic 2,3-epithiopropylthio compound such as 1,2-bis(2,3-epithiopropylthio)benzene, 1,3-bis(2,3-epithiopropylthio) benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl]sulfide, bis[4-(2,3-epithiopropylthio)phenyl]sulfone, and 4,4'-bis(2,3-epithiopropylthio)biphenyl; a linear aliphatic 2,3-epithiopropyloxy compound such as bis(2,3-epithiopropyl) ether, bis(2,3-epithiopropyloxy)methane, 1,2-bis(2,3-epithiopropyloxy)ethane, 1,2-bis(2,3-epithiopropyloxy) propane, 1,3-bis(2,3-epithiopropyloxy)propane, 1,3-bis(2,3-epithiopropyloxy)-2-methylpropane, 1,4-bis(2,3-epithiopropyloxy)butane, 1,4-bis(2,3-epithiopropyloxy)-2-methylbutane, 1,3-bis(2,3-epithiopropyloxy)butane, 1,5-bis(2,3-epithiopropyloxy)pentane, 1,5-bis(2,3-epithiopropyloxy)-2-methylpentane, 1,5-bis(2,3-epithiopropyloxy)-3-thiapentane, 1,6-bis(2,3- epithiopropyloxy)hexane, 1,6-bis(2,3-epithiopropyloxy)-2-methylhexane, 1,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymethyl)propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithiopropyloxymethyl)-3-thiapentane, 1-(2,3-epithiopropyloxy)-2,2-bis(2,3-epithiopropyloxymethyl)-4-thiahexane, 1,5,6-tris(23-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]thiomethyl]-2-(2,3-epithiopropyloxy)ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, and 1,11-bis(2,3-epithiopropyloxy)-5,7-bis(2,3-epithiopropyloxymethyl-3,6,9-trithiaundecane; a cycloaliphatic 2,3-epithiopropyloxy compound such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[[2-(2,3-epithiopropyloxy)ethyl]thiomethyl]-1,4-dithiane, and 2,5-bis(2,3-epithiopropyloxymethyl)-2,5-dimethyl-1,4-dithiane; and an aromatic 2,3-epithiopropyloxy compound such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-3-epithiopropyloxy)phenyl]propane, bis[4-(2,3-epithiopropyloxy)phenyl]sulfide, bis[4-(2,3-epithiopropyloxy)phenyl]sulfone, and 4,4'-bis(2,3-epithiopropyloxy)biphenyl.

<(A2-3) Polythietane Compound>

As the polythietane compound, a metal-containing thietane compound or a nonmetallic thietane compound is usable. As disclosed in WO2005/095490 and JP 2003-327583 A, these polythietane compounds have one or more thietanyl group in the molecule. A compound having 2 or more thietanyl groups in all is preferred. Examples thereof include a sulfide-type thietane compound such as bisthietanyl sulfide, bis(3-thietanylthio)disulfide, bis(3-thietanylthio)methane, and 3-(((3'-thietanylthio)methylthio)methylthio)thietane; and a polysulfide-type thietane compound such as bis(3-thietanyl)disulfide, bis(3-thietanyl)trisulfide, bis(3-thietanyl)tetrasulfide, and bis(3-thietanyl)pentasulfide.

<(A3) Radical-Polymerizable Monomer>

With no specific limitation, any known radical-polymerizable monomer is usable in the present invention, and for example, a (meth)acrylate compound (hereinafter this may be simply referred to as a component (A3-1)) and a (meth)acrylate group-free, carbon-carbon unsaturated bond-having radical-polymerizable compound (hereinafter this may be simply referred to as a vinyl compound or a component (A3-2)) may be used either singly or as combined.

<(A3-1) (meth)acrylate Compound>

As the (meth)acrylate compound, any known compound having at least one (meth)acrylate group in the molecule is usable with no specific limitation. Specific examples of the (meth)acrylate compound include glycidyl(meth)acrylate, trimethylolpropane tri(meth)acrylate, tetramethylolmethane tri(meth)acrylate, trimethylolpropane triethylene glycol tri(meth)acrylate, pentaerythritol tetra(meth)acrylate, dipentaerythritol hexa(meth)acrylate, urethane oligomer tetra(meth)acrylate, urethane oligomer hexa(meth)acrylate, polyester oligomer hexa(meth)acrylate, ethylene glycol di(meth)acrylate, diethylene glycol di(meth)acrylate, triethylene glycol di(meth)acrylate, polyethylene glycol di(meth)acrylate (especially having an average molecular weight of 308, 330, 508 or 736), tripropylene glycol di(meth)acrylate, bisphenol A di(meth)acrylate, 2,2-bis[4-((meth)acryloyloxypolyethoxy)phenyl]propane (especially having an average molecular weight of 478, 776 or 804), methoxypolyethylene glycol(meth)acrylate, methoxypolyethylene glycol(meth)acrylate (especially having an average molecular weight of 468), and methyl(meth)acrylate.

<(A3-2) Vinyl Compound>

Specific examples of the vinyl compound include methyl vinyl ketone, ethyl vinyl ketone, ethyl vinyl ether, styrene, vinylcyclohexane, butadiene, 1,4-pentadiene, divinyl sulfide, divinyl sulfone, 1,2-divinylbenzene, 1,3-divinyl-1,1,3,3-tetramethylpropanedisiloxane, diethylene glycol divinyl ether, divinyl adipate, divinyl sebacate, ethylene glycol divinyl ether, divinyl sulfoxide, divinyl persulfide, dimethyldivinylsilane, 1,2,4-trivinylcyclohexane, methyltrivinylsilane, α-methylstyrene and α-methylstyrene dimer.

Examples thereof further include diethylene glycol bisallyl carbonate, methoxypolyethylene glycol allyl ether (especially having an average molecular weight of 550), methoxypolyethylene glycol allyl ether (especially having an average molecular weight of 350), methoxypolyethylene glycol allyl ether (especially having an average molecular weight of 1500), polyethylene glycol allyl ether (especially having an average molecular weight of 450), methoxypolyethylene glycol-polypropylene glycol allyl ether (especially having an average molecular weight of 750), butoxypolyethylene glycol-polypropylene glycol allyl ether (especially having an average molecular weight of 1600), methacryloyloxypolyethylene glycol-polypropylene glycol allyl ether (especially having an average molecular weight of 560), phenoxypolyethylene glycol allyl ether (especially having an average molecular weight of 600), methacryloyloxypolyethylene glycol allyl ether (especially having an average molecular weight of 430), acryloyloxypolyethylene glycol allyl ether (especially having an average molecular weight of 420), vinyloxypolyethylene glycol allyl ether (especially having an average molecular weight of 560), styryloxypolyethylene glycol allyl ether (especially having an average molecular weight of 650), and methoxypolyethylenethioglycol allyl thioether (especially having an average molecular weight of 730).

The polymerizable monomer (A) is preferably a combination of a polyisocyanate compound and a polythiol compound, a combination of a polyisocyanate compound and a polyol compound, a polyepithio compound and/or a polythietane compound, or a combination of a polyepithio compound and a polythiol compound.

Among the above, the polymerizable monomer (A) is more preferably a combination of a polyisocyanate compound and a polythiol compound, or a combination of a polyepithio compound and a polythiol compound.

In the case where the polymerizable monomer (A) is a combination of a polyisocyanate compound and a polythiol compound, in particular, the polymerizable monomer (A) preferably contains at least one polyisocyanate compound selected from bis(isocyanatomethyl)bicyclo[2.2.1]heptane, xylylene diisocyanate, diphenylmethane diisocyanate and tolylene diisocyanate, and at least one polythiol compound selected from pentaerythritol tetrakis(3-mercaptopropionate) and 1,2-bis(2-mercaptoethylthio)-3-mercaptopropane.

In the case where the polymerizable monomer (A) is a combination of an epithio compound and a polythiol compound, in particular, the polymerizable monomer (A) preferably contains bis(2,3-epithiopropyl)disulfide, and a mixture consisting primarily of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane.

<(B) Benzotriazole-Based UV Absorbent Having a Maximum Absorption Wavelength of 360 nm or More and Less Than 380 nm>

In the present invention, the optical material composition contains a benzotriazole-based UV absorbent having a maximum absorption wavelength of 360 nm or more and less than 380 nm (B) (hereinafter this may be simply referred to as a component (B)), in order to be given an ability to cut UV rays and blue light.

The benzotriazole-based UV absorbent in the present invention is represented by the following formula (1).

In the present invention, the maximum absorption wavelength means a wavelength at which an absorption peak (a peak of a convex-form spectrum) appears in an absorption spectrum. Plural maximum absorption wavelength may be confirmed, and in such a case, it is enough that at least one maximum absorption wavelength is confirmed in a wavelength range specifically defined in the present invention. For example, the benzotriazole-based UV absorbent having a maximum absorption wavelength of 360 nm or more and less than 380 nm means a benzotriazole-based UV absorbent, of which at least one maximum absorption wavelength exists in a range of 360 nm or more and less than 380 nm.

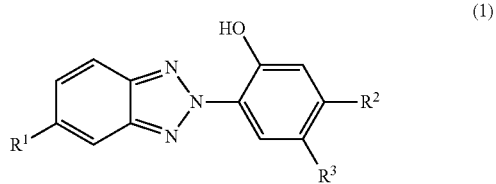

(1)

wherein $R^1$ represents a hydrogen atom, an alkyl group having 1 to 8 carbon atoms, an alkoxy group having 1 to 8 carbon atoms, a hydroxy group, a linear or branched mono-substituted amino group having 1 to 4 carbon atoms, a linear or branched di-substituted amino group having 1 to 4 carbon atoms, a nitro group, a carboxy group, an alkyloxycarbonyl group in which the alkyl group has 1 to 8 carbon atoms, a hydroxyalkyl group having 1 to 8 carbon atoms, an alkylcarbonyloxyalkyl group in which the alkyl groups each have 1 to 8 carbon atoms, a carboxyalkyl group in which the alkyl group has 1 to 3 carbon atoms, an alkyloxycarbonylalkyl group in which the alkyl groups have 2 to 10 carbon atoms in total, an aryl group, an acyl group, a sulfo group or a cyano group; $R^2$ represents a hydroxy group, an alkoxy group having 1 to 8 carbon atoms, an alkylthio group having 1 to 8 carbon atoms, a linear or branched mon-substituted amino group having 1 to 4 carbon atoms, or a linear or branched di-substituted amino group having 1 to 4 carbon atoms; $R^3$ represents a hydrogen atom, a hydroxy group, an alkyl group or alkoxy group having 1 to 8 carbon atoms, a linear or branched mono-substituted amino group having 1 to 4 carbon atoms, or a linear or branched di-substituted amino group having 1 to 4 carbon atoms; and $R^2$ and $R^3$ may crosslink to form a cyclic structure.

In the general formula (1), specific examples of $R^1$ include a hydrogen atom; a linear or branched, optionally-substituted alkyl group having 1 to 8 carbon atoms, such as a methyl group, an ethyl group, a propyl group, an isopropyl group, an n-butyl group, an isobutyl group, a sec-butyl group, a tert-butyl group, an n-hexyl group, an n-octyl group, and a 2-ethylhexyl group; a linear or branched, optionally-substituted alkoxy group having 1 to 8 carbon atoms, such as a methoxy group, an ethoxy group, a propoxy group, an isopropoxy group, an n-butoxy group, an isobutoxy group, a sec-butoxy group, a tert-butoxy group, an n-hexyloxy group, an n-octyloxy group, and a 2-ethylhexyloxy group; a hydroxy group; a linear or branched, optionally-substituted amino group having 1 to 4 carbon atoms, such as an amino group, a monomethylamino group, a dimethylamino group, a monoethylamino group, a diethylamino group, a mono-n-propylamino group, a di-n-propylamino group, a mono-isopropylamino group, and a diisopropylamino group; a nitro group; a carboxy group; a linear or branched, optionally-substituted alkyloxycarbonyl group in which the alkyl group has 1 to 8 carbon atoms, such as a methoxycarbonyl group, an ethoxycarbonyl group, an isopropoxycarbonyl group, an n-butoxycarbonyl group, an isobutoxycarbonyl group, a sec-butoxycarbonyl group, a tert-butoxycarbonyl group, an n-hexyloxycarbonyl group, an n-octyloxycarbonyl group, and a 2-ethylhexyloxycarbonyl group; a linear or branched, optionally-substituted hydroxyalkyl group having 1 to 8 carbon atoms, such as a hydroxymethyl group, a hydroxyethyl group, a hydroxypropyl group, a hydroxybutyl group, a hydroxyhexyl group, and a hydroxyoctyl group; a linear or branched, optionally-substituted alkylcarbonyloxyalkyl group in which the alkyl groups each have 1 to 8 carbon atoms, such as a methylcarbonyloxymethyl group, an ethylcarbonyloxymethyl group, a propylcarbonyloxymethyl group, a butylcarbonyloxymethyl group, a hexylcarbonyloxymethyl group, a heptylcarbonyloxymethyl group, an octylcarbonyloxymethyl group, a methylcarbonyloxyethyl group, an ethylcarbonyloxyethyl group, a propylcarbonyloxyethyl group, a butylcarbonyloxyethyl group, a hexylcarbonyloxyethyl group, a heptylcarbonyloxyethyl group, and an octylcarbonyloxyethyl group; a carboxyalkyl group such as a carboxymethyl group, a carboxyethyl group, and a carboxypropyl group; a linear or branched alkyloxycarbonylalkyl group in which the alkyl groups each have 1 to 8 carbon atoms, such as a methyloxycarbonylmethyl group, an ethyloxycarbonylethyl group, and a propyloxycarbonylethyl group; an aryl group such as a phenyl group, a benzyl group, a tolyl group and a xylyl group; an acyl group such as a formyl group, an acetyl group, a propionyl group, a butyryl group, and a benzoyl group; a sulfo group; and a cyano group. Specific examples of $R^2$ include a hydroxy group; a linear or branched, optionally-substituted alkoxy group having 1 to 8 carbon atoms, such as a methoxy group, an ethoxy group, a propoxy group, an isopropoxy group, an n-butoxy group, an isobutoxy group, a sec-butoxy group, a tert-butoxy group, an n-hexyloxy group, an n-octyloxy group, and a 2-ethylhexyloxy group; a linear or branched, optionally-substituted alkylthio group having 1 to 8 carbon atoms, such as a methylthio group, an ethylthio group, a propylthio group, an isopropylthio group, an n-butylthio group, an isobutylthio group, a sec-butylthio group, a tert-butylthio group, an n-hexylthio group, an n-octylthio group, and a 2-ethylhexylthio group; and a linear or branched, optionally-substituted amino group having 1 to 4 carbon atoms, such as a monomethylamino group, a dimethylamino group, a monoethylamino group, a diethylamino group, a mono-n-propylamino group, a di-n-propylamino group, a mono-isopropylamino group, and a di-isopropylamino group. Specific examples of $R^3$ include a hydrogen atom; a hydroxy group; a linear or branched, optionally-substituted alkyl group having 1 to 8 carbon atoms, such as a methyl group, an ethyl group, a propyl group, an isopropyl group, an n-butyl group, an isobutyl group, a sec-butyl group, a tert-butyl group, an n-hexyl group, an n-octyl group, and a 2-ethylhexyl group; a linear or branched, optionally-substituted alkoxy group having 1 to 8 carbon atoms, such as a methoxy group, an ethoxy group, a propoxy group, an isopropoxy group, an n-butoxy group, an isobutoxy group, a sec-butoxy group, a tert-butoxy group, an n-hexyloxy group, an n-octyloxy group, and a 2-ethylhexyloxy group; and a linear or branched, optionally-substituted amino group having 1 to 4 carbon atoms, such as a monomethylamino group, a dimethylamino group, a monoethylamino group, a diethylamino group, a mono-n-propylamino group, a di-n-propylamino group, a mono-isopropylamino group, and a di-isopropylamino group. In the case where $R^2$ and $R^3$ form a crosslinked cyclic structure, examples thereof include a methylenedioxy group, and an ethylenedioxy group.

Among the above-mentioned ones, the benzotriazole derivative compound represented by the general formula (1) is preferably such that $R^1$ is a hydrogen atom, a methyl group, a methoxy group, an n-octyloxy group, a hydroxy group, a carboxy group, a methoxycarbonyl group, an ethoxycarbonyl group, an isopropoxycarbonyl group, an n-butoxycarbonyl group, an isobutoxycarbonyl group, a sec-butoxycarbonyl group, a tert-butoxycarbonyl group, an n-hexyloxycarbonyl group, an n-octyloxycarbonyl group, a hydroxyethyl group, a methylcarbonyloxyethyl group, or a heptylcarbonyloxyethyl group, $R^2$ is a methoxy group, an ethoxy group, an n-octyloxy group, a dimethylamino group, or a diethylamino group, and $R^3$ is a hydrogen atom, a methyl group, an ethyl group, a methoxy group, an ethoxy group, an n-octyloxy group, or a dimethylamino group, and in the case where $R^2$ and $R^3$ form a crosslinked cyclic structure, a methylenedioxy group is preferred.

Here, preferably, an electron-donating substituent is selected for $R^2$ or for $R^2$ and $R^3$, and/or an electron-attractive substituent is selected for $R^1$, from the viewpoint of the maximum absorption wavelength.

The electron-donating substituent includes a hydroxy group, an alkoxy group having 1 to 8 carbon atoms, an alkylthio group having 1 to 8 carbon atoms, a linear or branched mono-substituted amino group having 1 to 4 carbon atoms, and a linear or branched di-substituted amino group having 1 to 4 carbon atoms. As mentioned above, in the case where $R^2$ and $R^3$ crosslink to form a methylenedioxy group, $R^2$ and $R^3$ are electron-donating substituents. The electron-attractive substituent includes a nitro group, a carboxy group, an alkyloxycarbonyl group, an acyl group, a sulfo group and a cyano group.

Examples of the benzotriazole derivative compound represented by the general formula (1) in the present invention include 2-(2-hydroxy-4-dimethylaminophenyl)-5-methyloxycarbonyl-2H-benzotriazole, 2-(2-hydroxy-4-dimethylaminophenyl)-5-ethyloxycarbonyl-2H-benzotriazole, 2-(2-hydroxy-4-dimethylaminophenyl)-5-butyloxycarbonyl-2H-benzotriazole, 2-(2-hydroxy-4-dimethylaminophenyl)-5-octyloxycarbonyl-2H-benzotriazole, 2-(2-hydroxy-4-dimethylaminophenyl)-5-methyl-2H-benzotriazole, 2-(2-hydroxy-4-diethylaminophenyl)-5-butyloxycarbonyl-2H-benzotriazole, 2-(2-hydroxy-4-dimethylamino-5-methylphenyl)-5-methyloxycarbonyl-2H-benzotriazole, 2-(2-hydroxy-4-dimethylamino-5-methylphenyl)-5-butyloxycarbonyl-2H-benzotriazole, 2-(2-hydroxy-4-dimethylamino-5-methylphenyl)-5-octyloxycarbonyl-2H-benzotriazole, 2-(2-hydroxy-4-dimethylamino-5-methylphenyl)-5-methyl-2H-benzotriazole, 2-(2-hydroxy-4,5-dimethoxyphenyl)-5-methyloxycarbonyl-2H-benzotriazole, 2-(2-hydroxy-4,5-dimethoxyphenyl)-5-butyloxycarbonyl-2H-benzotriazole, 2-(2-hydroxy-4,5-dimethoxyphenyl)-5-octyloxycarbonyl-2H-benzotriazole, 2-(2-hydroxy-4,5-dimethoxyphenyl)-5-methyl-2H-benzotriazole, 6-(5-heptylcarbonyloxyethyl-2H-benzotriazol-2-yl)benzo[1,3]dioxol-5-ol, 6-(5-isoheptylcarbonyloxyethyl-2H-benzotriazol-2-yl)benzo[1,3]dioxol-5-ol, 6-(5-octyloxy-2H-benzotriazol-2-yl)benzo[1,3]dioxol-5-ol, 6-(5-methylcarbonyloxyethyl-2H-benzotriazol-2-yl)benzo[1,3]dioxol-5-ol, 7-(5-methyloxycarbonyl-2H-benzotriazol-2-yl)benzo[1,4]dioxin-6-ol, 7-(5-butyloxycarbonyl-2H-benzotriazol-2-yl)benzo[1,4]dioxin-6-ol, 7-(5-octyloxycarbonyl-2H-benzotriazol-2-yl)benzo[1,4]dioxin-6-ol, and 7-(5-methyl-2H-benzotriazol-2-yl)benzo[1,4]dioxin-6-ol.

The component (B) is preferably a compound of the above formula (1) where $R^2$ and $R^3$ crosslink to form a methylenedioxy group. Specifically, the component (B) is preferably 6-(5-heptylcarbonyloxyethyl-2H-benzotriazole-2-yl)benzo[1,3]dioxol-5-ol, 6-(5-isoheptylcarbonyloxyethyl-2H-benzotriazole-2-yl)benzo[1,3]dioxol-5-ol, 6-(5-octyloxy-2H-benzotriazole-2-yl)benzo[1,3]dioxol-5-ol, or 6-(5-methylcarbonyloxyethyl-2H-benzotriazole-2-yl)benzo[1,3]dioxol-5-ol, and above all, more preferably 6-(5-heptylcarbonyloxyethyl-2H-benzotriazole-2-yl)benzo[1,3]dioxol-5-ol.

The absorption coefficient of the component (B) is, from the viewpoint of easy handleability and for the purpose of efficiently exhibiting the effect, preferably within a range of 10 to 200 (L/(gcm)). Falling within the range, the optical material to be obtained by polymerizing and curing the optical material composition can exhibit the excellent effect of an ability to cut UV rays and blue light, without lowering the strength thereof.

When the blending amount of the component (B) is 0.005 to 0.3 parts by mass relative to 100 parts by mass of the component (A), the composition can be polymerized and cured to give an optical material having an excellent effect of an ability to cut UV rays and blue light without lowering the strength of the resultant optical material. For more enhancing the effect, the blending amount of the compound (B) is more preferably 0.01 to 0.2 parts by mass.

The optical material composition of the present invention containing the above-mentioned component (A) and component (B) hardly precipitates the UV absorbent and is excellent in long-term storage stability.

<Additives>

As needed, a polymerization catalyst and a polymerization initiator may be added to the optical material composition of the present invention for polymerizing and curing the composition. In addition, the optical material composition of the present invention may further contain, as other optional components within a range not detracting from the effect, various known additives, for example, an antistatic agent, an internal release agent, an antioxidant, a discoloration inhibitor, a fluorescent dye, a dye, a pigment, a fragrance, a solvent, a leveling agent, a resin modifier, a light stabilizer, an IR absorbent, and a visible light absorbent. Further, in addition to the above-mentioned UV absorbent, any other known UV absorbent whose maximum absorption wavelength does not fall within a range of 360 nm or more and less than 380 nm can also be added to the composition.

Polymerization Catalyst

The polymerization catalyst includes tertiary amines and inorganic or organic salts corresponding thereto, phosphines, quaternary ammonium salts, quaternary phosphonium salts, Lewis acids, and organic sulfonic acids.

Specific examples of the reaction catalyst are mentioned below.

Tertiary amines: triethylamine, tripropylamine, dip ropylethylamine, tributylamine, dimethylcyclohexylamine, triethylenediamine, tetramethylethylenediamine, N,N-dicyclohexylmethylamine, N,N-diisopropylethylamine, N-isopropyl-N-methylbutylamine, N-methylpiperidine, N-ethylpiperidine, N,N-dimethylpiperazine, N,N-diethylpiperazine, hexamethylenetetramine, N-methylmorpholine, N-ethylmorpholine, N-methylpiperidone, N-methylpyrrolidine, N-ethylpyrrolidine, N-methylpyrrolidone, N,N-dimethylbenzylamine, N,N-dimethylaniline, N-methyldibenzylamine, pyridine, N-methylpyrazole, 1-methylimidazole, 1,2-dimethylimidazole, benzylmethylimidazole, N-methylpyrrole, diphenylmethylamine.

Phosphines: trimethyl phosphine, triethyl phosphine, tri-n-propyl phosphine, triisopropyl phosphine, tri-n-butyl phosphine, triphenyl phosphine, tribenzyl phosphine, 1,2-bis(diphenylphosphino)ethane, 1,2-bis(dimethylphosphino)ethane.

Quaternary ammonium salts: tetramethylammonium bromide, tetrabutylammonium chloride, tetrabutylammonium bromide, triethylbenzylammonium chloride, cetyldimethylbenzylammonium chloride, 1-n-dodecylpyridinium chloride.

Quaternary phosphonium salts: tetramethylphosphonium bromide, tetrabutylphosphonium chloride, tetrabutylphosphonium bromide, tetraphenylphosphonium bromide.

Lewis acids: triphenyl aluminum, dimethyltin dichloride, dimethyltin bis(isooctylthioglycolate), dibutyltin dichloride, dibutyltin dilaurate, dibutyltin maleate, dibutyltin maleate polymer, dibutyltin diricinolate, dibutyltin bis(dodecylmercaptide), dibutyltin bis(isooctylthioglycolate), dioctyltin dichloride, dioctyltin maleate, dioctyltin maleate polymer, dioctyltin bis(butyl maleate), dioctyltin dilaurate, dioctyltin diricinolate, dioctyltin dioleate, dioctyltin di(6-hydroxy)caproate, dioctyltin bis(isooctylthioglycolate), didodecyltin diricinolate; other various metal salts, for example, copper oleate, copper acetylacetonate, iron acetylacetonate, iron naphthenate, iron lactate, iron citrate, iron gluconate, potassium octanoate, 2-ethylhexyl titanate.

Organic sulfonic acids: methanesulfonic acid, benzenesulfonic acid, p-toluenesulfonic acid.

The amount of the polymerization catalyst to be added is suitably 0.001 to 1 part by mass relative to 100 parts by mass of the total amount of the component (A), preferably 0.002 to 0.5 parts by mass, more preferably 0.005 to 0.4 parts by mass.

Polymerization Initiator:

With no specific limitation, any known thermal polymerization initiator and photopolymerization initiator can be used as the polymerization initiator. Typical examples of the polymerization initiator are mentioned below.

Thermal polymerization initiator: diacyl peroxides such as benzoyl peroxide, p-chlorobenzoyl peroxide, decanoyl peroxide, lauroyl peroxide, and acetyl peroxide; peroxy esters such as tert-butylperoxy-2-ethylhexanoate, tert-butylperoxy neodecanoate, cumylperoxy neodecanoate, and tert-butylperoxy benzoate; percarbonates such as diisopropylperoxy dicarbonate, and di-sec-butylperoxy dicarbonate; azo compounds such as azobisisobutyronitrile.

Photopolymerization initiator: benzophenone; acetophenone compounds such as 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)butanone-1, and 1-(4-isopropylphenyl)-2-hydroxy-2-methylpropan-1-one; α-dicarbonyl compounds such as 1,2-diphenylethanedione, and methylphenyl glyoxylate; acylphosphine oxide compounds such as 2,6-dimethylbenzoyl-diphenylphosphine oxide, bis(2,4,6-trimethylbenzoyl)-phenylphosphine oxide, bis(2,6-dimethoxybenzoyl)-2,4,4-trimethyl-pentylphosphine oxide, 2,4,6-trimethylbenzoyldiphenylphosphine oxide, methyl 2,4,6-trimethylbenzoyldiphenylphosphinate, 2,6-dichlorobenzoyldiphenylphosphine oxide, 2,6-dimethoxybenzoyldiphenylphosphine oxide; 1,2-octanedione-1-[4-(phenylthio)-2-(O-benzoyloxime)].

The amount of the polymerization initiator to be added is preferably 0.01 to 0.5 parts by mass relative to 100 parts by mass of the total amount of the component (A), more preferably 0.05 to 0.4 parts by mass.

Internal Release Agent

The internal release agent includes a fluorine-based nonionic surfactant, a silicone-based nonionic surfactant, an alkyl quaternary ammonium salt, a phosphate, an acid phosphate, an oxyalkylene-type acid phosphate, an alkali metal salt of an acid phosphate, an alkali metal salt of an oxyalkylene-type acid phosphate, a metal salt of a higher fatty acid, a higher fatty acid ester, a paraffin, a wax, a higher aliphatic amide, a higher aliphatic alcohol, a polysiloxane, and an aliphatic amine ethylene oxide adduct. Examples of the acid phosphate usable herein include Zelec UN by Stepan Company; MR internal release agents by Mitsui Chemicals, Inc.; JP series by Johoku Chemical Co., Ltd.; Phosphanol Series by Toho Chemical Industry Co., Ltd.; and AP, DP series by Daihachi Chemical Industry Co., Ltd.

Resin Modifier

A resin modifier may be added to the optical material composition of the present invention for the purpose of controlling various properties such as optical properties, impact resistance and specific gravity of resin, and for controlling the viscosity and the pot life of the optical material composition, within a range not detracting from the advantageous effects of the present embodiment. For example, an episulfide compound, an alcohol compound, an amine compound, an epoxy compound, an organic acid and an anhydride thereof, and an olefin compound including a (meth)acrylate compound can be used.

Visible Light Absorbent

With no specific limitation, any compound whose maximum absorption wavelength falls within a range of 400 nm to 750 nm can be used as the visible light absorbent. For example, a perylene compound, a porphyrin compound, a carotenoid compound, a cyanine compound, a phthalocyanine compound, an anthraquinone compound an indigo compound, a neodymium compound, and a tetraazaporphyrin compound can be used.

<Optical Material>

The optical material of the present invention is a cured product produced by polymerizing and curing the above-mentioned optical material composition. Preferably, the optical material has a light transmittance at wavelength of 400 nm of 5% or less and a light transmittance at a wavelength of 420 nm of 70% or less, and has a light cut rate in a wavelength range of 380 nm to 500 nm (this may also be referred to as a blue light cut rate) of 35% or more.

More preferably, the light transmittance of the optical material at a wavelength of 400 nm is 3% or less, even more preferably 1% or less.

More preferably, the light transmittance of the optical material at a wavelength of 420 nm is 65% or less, even more preferably 60% or less.

More preferably, the light cut rate in a wavelength range of 380 nm to 500 nm is 38% or more, even more preferably 40% or more.

The light cut rate in a wavelength range of 380 to 500 nm is determined as follows. At intervals of 10 nm in a wavelength range of 380 nm to 500 nm, the transmittance is measured, and the found data of the transmittance at intervals of 10 nm are averaged to give an average value (this may be also referred to as an average value of transmittance (T) in 380 to 500 nm), and the light cut rate is calculated according to the following formula.

Blue light cut rate=100−(average value of transmittance (T) in 380 nm to 500 nm)

Though not specifically limited in point of use thereof, the optical material produced by polymerizing and curing the optical material composition of the present invention is favorably used as various plastic lenses such as ordinary eyeglass lenses, goggles, eye correction glass lenses, lenses for imaging devices, Fresnel lenses for liquid-crystal projectors, reticular lenses, and contact lenses.

A production method for the optical material includes mixing one or more benzotriazole-based UV absorbent selected from the above-mentioned formula (1) with a polymerizable monomer to give an optical material composition, and then polymerizing, curing and molding the composition according to a known production method.

Also not specifically limited, cast molding polymerization is generally employed for the production method for plastic lenses using the optical material composition. For example, a polymerization initiator is optionally mixed with the optical material composition, and the resultant mixture liquid is cast into a mold for lens molding, and heated therein generally at a temperature falling between −20 and 150° C. to give a plastic lens.

<Secondary Processing of Optical Material; Lamination with Coating Layer>

The optical material obtained by polymerizing and curing the optical material composition of the present invention, especially a plastic lens formed of the optical material is, as needed, optionally coated with a coating layer on one surface of both surfaces thereof.

Specifically, the coating layer includes a primer layer, a hard coat layer, an antireflection layer, an anti-fogging coat layer, an anticontamination layer, and a water repellent layer. These coating layers may be used alone, or plural coating layers may be multilayered for use herein. In the case where the coating layer is formed on both surfaces, the same coating layer may be formed on both surfaces, or different coating layers may be formed thereon.

In these coating layers, a known UV absorbent, an IR absorbent for the purpose of protecting eyes from IR rays, a light stabilizer and an antioxidant for improving the weather resistance of lenses, a dye and a pigment and further a photochromic dye and a photochromic pigment for enhancing the fashionability of lenses, an antistatic agent, and other known additives for enhancing the performance of lenses may be used optionally as combined. For the coating layer to be formed by coating operation, various leveling agents can be used for the purpose of improving the coating performance.

In the case where a hard coat layer is provided, a coating liquid containing an organic silicon compound or a fine particulate inorganic substance of tin oxide, silicon oxide, zirconium oxide or titanium oxide is applied and cured to form the layer. For the purpose of improving impact resistance or improving adhesiveness to the hard coat layer, a primer layer consisting primarily of a polyurethane may be provided on the surface of a plastic lens. Further, for imparting a performance of antireflection, an antireflection layer can be formed on the hard coat layer, using silicon oxide, titanium oxide, zirconium oxide or tantalum oxide. Further on the antireflection layer, a water repellent film may be arranged using a fluorine atom-having organic silicon compound for the purpose of improving water repellency.

EXAMPLES

Hereinunder Examples are given for specifically describing the present invention, but the present invention is not limited to these Examples.

Physical properties of plastic lenses obtained by polymerizing and curing an optical material composition were determined according to the following methods.

(1) Measurement of Light Transmittance at 400 nm and 420 nm

Using a spectrophotometer (UV-2550, by Shimadzu Corporation), a transmittance at a wavelength of 380 to 800 nm was measured, and the light transmittance and the luminous transmittance at the wavelength were determined.

(2) Measurement of Light Cut Rate in Blue Region (Wavelength Range of 380 nm to 500 nm)

Using a spectrophotometer (UV-2550, by Shimadzu Corporation), a transmittance at a wavelength of 380 to 500 nm was measured, and from the transmittance (T (%)) at intervals of 10 nm, the blue light cut rate was calculated according to the following formula.

Blue light cut rate (%)=100−(average value of transmittance (T) at 380 to 500 nm)

The maximum absorption wavelength of UV absorbent was determined according to the following method.

As a measuring instrument, Shimadzu Spectrophotometer UV-2550 by Shimadzu Corporation was used. For the measurement, a substance to be measured was dissolved in a solvent (chloroform) to give a solution thereof (concentration $1.0 \times 10^{-4}$ mol/L), and the solution was analyzed through a quartz cell having a light path length of 10 mm.

Example 1

0.06 parts by mass of a catalyst, dimethyltin dichloride, 0.15 parts by mass of a release agent, acid phosphate JP-506H (by Johoku Chemical Co., Ltd.), and 0.04 parts by mass of a UV absorbent, 6-(5-heptylcarbonyloxyethyl-2H- benzotriazol-2-yl)benzo[1,3]dioxol-5-ol (maximum absorption wavelength: 367 nm) were added to 50.28 parts by mass of bis(isocyanatomethyl)bicyclo[2.2.1]heptane, and mixed with stirring, and further, 25.50 parts by mass of pentaerythritol tetrakis(3-mercaptopropionate) and 24.22 parts by mass of 1,2-bis(2-mercaptoethylthio)-3-mercaptopropane were added, and mixed with stirring under a reduced pressure of 10 mmHg for 30 minutes to prepare an optical material composition. Next, the optical material composition was cast into a previously-prepared lens-molding mold (center thickness 2.0 mm) composed of a glass mold and a resin gasket, and polymerized in an electric furnace at 20° C. to 120° C. taking 24 hours. After the polymerization, the gasket and the mold were removed, and the cured product was heat-treated at 120° C. for 2 hours to give a plastic lens. The evaluation results of the resultant lens are shown in Table 1.

Example 2

0.04 parts by mass of a catalyst, dimethyltin dichloride, 0.15 parts by mass of a release agent, acid phosphate JP-506H (by Johoku Chemical Co., Ltd.), and 0.04 parts by mass of a UV absorbent, 6-(5-heptylcarbonyloxyethyl-2H-benzotriazol-2-yl)benzo[1,3]dioxol-5-ol (maximum absorption wavelength: 367 nm) were added to 52.02 parts by mass of xylylene diisocyanate and mixed with stirring, and further, 47.98 parts by mass of 1,2-bis(2-mercaptoethylthio)-3-mercaptopropane was added, and mixed with stirring under a reduced pressure of 10 mmHg for 30 minutes to prepare an optical material composition. Next, the optical material composition was cast into a previously-prepared lens-molding mold (center thickness 2.0 mm) composed of a glass mold and a resin gasket, and polymerized in an electric furnace at 20° C. to 120° C. taking 24 hours. After the polymerization, the gasket and the mold were removed, and the cured product was heat-treated at 120° C. for 2 hours to give a plastic lens. The evaluation results of the resultant lens are shown in Table 1.

Example 3

0.04 parts by mass of 6-(5-heptylcarbonyloxyethyl-2H-benzotriazol-2-yl)benzo[1,3]dioxol-5-ol (maximum absorption wavelength: 367 nm), and 90.9 parts by mass of bis(2,3-epithiopropyl)disulfide were put into a fully-dried flask, an stirred at 20° C. for 1 hour to prepare a solution. A solution prepared by dissolving 0.019 parts by mass of N,N-dimethylcyclohexylamine and 0.09 parts by mass of N,N-dicyclohexylmethylamine in 9.1 parts by mass of a mixture consisting primarily of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane was added to the above solution, and stirred at 20° C. for 30 minutes to give an optical material composition. The optical material composition was defoamed under 600 Pa for 1 hour, then filtered through a 1-μm PTFE filter, and thereafter the resultant optical material composition was cast into a previously-prepared lens-molding mold (center thickness 2.0 mm) composed of a glass mold and a resin gasket. The glass mold was polymerized at 30° C. to 80° C. taking 21 hours. After the polymerization, the gasket and the mold were removed, and the cured product was heat-treated at 120° C. for 3 hours to give a plastic lens. The evaluation results of the resultant lens are shown in Table 1.

Example 4

90.00 parts by mass of methyl methacrylate, 10.00 parts by mass of ethylene glycol dimethacrylate, 0.04 parts by mass of a UV absorbent, 6-(5-heptylcarbonyloxyehtyl-2H-benzotriazol-2-yl)benzo[1,3]dioxol-5-ol (maximum absorption wavelength: 367 nm) and 0.10 parts by mass of a thermal polymerization initiator, azobisisobutyronitrile were mixed, well stirred at room temperature, and then degassed under a reduced pressure of 50 mmHg for 10 minutes to give an optical material composition. Next, the optical material composition was cast into a previously-prepared lens-molding mold (center thickness 2.0 mm) composed of a glass mold and a resin gasket, and polymerized in an electric furnace at 40° C. to 85° C. taking 24 hours. After the polymerization, the gasket and the mold were removed, and the cured product was heat-treated at 100° C. for 2 hours to give a plastic lens. The evaluation results of the resultant lens are shown in Table 1.

Examples 5 to 8

Plastic lenses were produced in the same manner as in Examples 1 to 4, except that in Examples 1 to 4, the amount of the UV absorbent to be added was changed as in Table 1. The evaluation results of the resultant lenses are shown in Table 1.

In the optical material compositions produced in Examples 1 to 8, UV absorbent precipitation was not confirmed within 24 hours at room temperature (25° C.), and these compositions were excellent in long-term storage stability.

Comparative Examples 1 and 2

Plastic lenses were produced in the same manner as in Examples 1 and 5, except that the UV absorbent was changed to 2-(3-tert-butyl-2-hydroxy-5-methylphenyl)-5-chloro-2H-benzotriazole (maximum absorption wavelength: 352 nm). The evaluation results of the resultant lenses are shown in Table 1.

TABLE 1

| | Polymerizable Monomer (A) | UV Absorbent (B) (part by mass) | Transmittance (%) 400 nm | Transmittance (%) 420 nm | Blue Light Cut Rate (%) |
|---|---|---|---|---|---|
| Example 1 | A1, A2, A3 | B1 (0.04) | 1 | 54 | 40 |
| Example 2 | A4, A3 | B1 (0.04) | 0 | 50 | 42 |
| Example 3 | A5, A6 | B1 (0.04) | 0 | 15 | 44 |
| Example 4 | A7, A8 | B1 (0.04) | 1 | 57 | 39 |
| Example 5 | A1, A2, A3 | B1 (0.06) | 0 | 44 | 43 |
| Example 6 | A4, A3 | B1 (0.06) | 0 | 38 | 44 |
| Example 7 | A5, A6 | B1 (0.06) | 0 | 11 | 46 |
| Example 8 | A7, A8 | B1 (0.1) | 0 | 30 | 44 |
| Comparative Example 1 | A1, A2, A3 | B2 (0.04) | 8 | 83 | 32 |
| Comparative Example 2 | A1, A2, A3 | B2 (0.06) | 6 | 81 | 33 |

The polymerizable monomer (A) and the UV absorbent (B) in the Table are as follows.
(Polymerizable Monomer)
  A1: Bis(isocyanatomethyl)bicyclo[2.2.1]heptane
  A2: Pentaerythritol tetrakis(3-mercaptopropionate)
  A3: 1,2-Bis(2-mercaptoethylthio)-3-mercaptopropane
  A4: Xylylene diisocyanate
  A5: Bis(2,3-epithiopropyl) disulfide
  A6: Mixture consisting primarily of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, A7: Methyl methacrylate A8: Ethylene glycol dimethacrylate (UV Absorbent)

B 1: 6-(5-Heptylcarbonyloxyethyl-2H-benzotriazole-2-yl)benzo[1,3]dioxol-5-ol

B2: 2-(3-Tert-butyl-2-hydroxy-5-methylphenyl)-5-chloro-2H-benzotriazole

The results in Examples and Comparative Examples verify the following.

In Examples 1 to 8, the lenses all cut UV rays and blue light that are harmful to eyes, and are effective for prevention of blue light hazard. As opposed to these, the lenses in Comparative Examples 1 and 2 have a high transmittance at 420 nm and a low blue light cut rate, and it is known that, when a UV absorbent not falling within the range of the present invention is used, the blue light cut performance is insufficient.

The invention claimed is:

1. A heat curable optical material composition comprising:

(A) 100 parts by mass of a polymerizable monomer, and (B) 0.001 to 0.3 parts by mass of a UV absorbent having a maximum absorption wavelength of 360 nm or more and less than 380 nm and represented by the following formula (1):

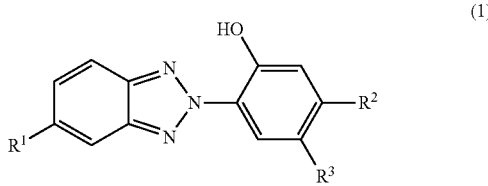

wherein $R^1$ represents a hydrogen atom, an alkyl group having 1 to 8 carbon atoms, an alkoxy group having 1 to 8 carbon atoms, a hydroxy group, a linear or branched mono-substituted amino group having 1 to 4 carbon atoms, a linear or branched di-substituted amino group having 1 to 4 carbon atoms, a nitro group, a carboxy group, an alkyloxycarbonyl group in which the alkyl group has 1 to 8 carbon atoms, a hydroxyalkyl group having 1 to 8 carbon atoms, an alkylcarbonyloxyalkyl group in which the alkyl groups each have 1 to 8 carbon atoms, a carboxyalkyl group in which the alkyl group has 1 to 3 carbon atoms, an alkyloxycarbonylalkyl group in which the alkyl groups have 2 to 10 carbon atoms in total, an aryl group, an acyl group, a sulfo group or a cyano group; $R^2$ represents a hydroxy group, an alkoxy group having 1 to 8 carbon atoms, an alkylthio group having 1 to 8 carbon atoms, a linear or branched mono-substituted amino group having 1 to 4 carbon atoms, or a linear or branched di-substituted amino group having 1 to 4 carbon atoms; $R^3$ represents a hydrogen atom, a hydroxy group, an alkyl group or alkoxy group having 1 to 8 carbon atoms, a linear or branched mono-substituted amino group having 1 to 4 carbon atoms, or a linear or branched di-substituted amino group having 1 to 4 carbon atoms; and $R^2$ and $R^3$ may crosslink to form a cyclic structure.

2. The heat curable optical material composition according to claim 1, wherein the polymerizable monomer (A) contains at least one polyisocyanate compound selected from bis(isocyanatemethyl)bicyclo[2.2.1]heptane, xylylene diisocyanate, diphenylmethane diisocyanate and tolylene diisocyanate, and at least one polythiol compound selected from pentaerythritol tetrakis(3-mercaptopropionate) and 1,2-bis(2-mercaptoethylthio)-3-mercaptopropane.

3. The heat curable optical material composition according to claim 1, wherein the polymerizable monomer (A) contains bis(2,3-epithiopropyl) disulfide, and a mixture consisting primarily of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane.

4. An optical material formed of a cured product produced by polymerizing and curing the heat curable optical material composition of claim 1, which has a light transmittance at a wavelength of 400 nm of 5% or less, a light transmittance at a wavelength of 420 nm of 70% or less, and a light cut rate in a wavelength range of 380 to 500 nm of 35% or more.

5. A plastic lens formed of the optical material of claim 4.

6. The heat curable optical material composition according to claim 1, wherein $R^1$ represents an alkyl group having 1 to 8 carbon atoms, an alkoxy group having 1 to 8 carbon atoms, a hydroxy group, a linear or branched mono-substituted amino group having 1 to 4 carbon atoms, a linear or branched di-substituted amino group having 1 to 4 carbon atoms, a nitro group, a carboxy group, an alkyloxycarbonyl group in which the alkyl group has 1 to 8 carbon atoms, a hydroxyalkyl group having 1 to 8 carbon atoms, an alkylcarbonyloxyalkyl group in which the alkyl groups each have 1 to 8 carbon atoms, a carboxyalkyl group in which the alkyl group has 1 to 3 carbon atoms, an alkyloxycarbonylalkyl group in which the alkyl groups have 2 to 10 carbon atoms in total, an aryl group, an acyl group, a sulfo group or a cyano group.

* * * * *